US008709120B2

(12) United States Patent
Vulfson

(10) Patent No.: US 8,709,120 B2
(45) Date of Patent: Apr. 29, 2014

(54) FILTER MEDIA INCLUDING GLASS FIBERS

(75) Inventor: Yuri Vulfson, Corvallis, OR (US)

(73) Assignee: Hollingsworth & Vose Company, East Walpole, MA (US)

( * ) Notice: Subject to any disclaimer, the term of this patent is extended or adjusted under 35 U.S.C. 154(b) by 336 days.

(21) Appl. No.: 12/976,132

(22) Filed: Dec. 22, 2010

(65) Prior Publication Data

US 2012/0160104 A1 Jun. 28, 2012

(51) Int. Cl.
*B01D 24/00* (2006.01)
(52) U.S. Cl.
USPC ............. 55/527; 428/366; 442/302; 442/331; 442/348
(58) Field of Classification Search
USPC ........... 501/35, 47, 49–52, 58–59, 61, 65–67, 501/75–79; 55/523–527; 60/311; 422/164–167; 280/728.1–743.1; 141/14–17, 59, 98; 166/227–236; 428/366; 95/273; 442/164–167, 302, 442/331, 348
See application file for complete search history.

(56) References Cited

U.S. PATENT DOCUMENTS

| | | | |
|---|---|---|---|
| 2,335,463 A | | 11/1943 | Steinbock |
| 3,085,887 A | | 4/1963 | Labino et al. |
| 3,900,306 A | * | 8/1975 | Brueggemann et al. ........ 65/475 |
| 4,047,965 A | | 9/1977 | Karst et al. |
| 4,177,077 A | | 12/1979 | Gagin |
| 4,181,514 A | * | 1/1980 | Lefkowitz et al. ............... 55/488 |
| 5,108,957 A | * | 4/1992 | Cohen et al. ..................... 501/35 |
| 5,330,940 A | * | 7/1994 | Aitken et al. .................... 501/35 |
| 5,580,459 A | | 12/1996 | Powers et al. |
| 5,672,399 A | | 9/1997 | Kahlbaugh et al. |
| 5,785,725 A | | 7/1998 | Cusick et al. |
| 5,932,499 A | | 8/1999 | Xu et al. |
| 5,972,500 A | | 10/1999 | Gross et al. |
| 6,034,014 A | | 3/2000 | Rapp et al. |
| 6,107,224 A | | 8/2000 | Xu et al. |
| 6,171,684 B1 | | 1/2001 | Kahlbaugh et al. |
| 6,358,871 B1 | | 3/2002 | Sircar |
| 6,656,861 B1 | | 12/2003 | Bauer et al. |
| 6,794,321 B2 | | 9/2004 | Bauer |
| 6,794,322 B2 | | 9/2004 | Sircar |
| 6,828,264 B2 | | 12/2004 | Bauer |
| 6,933,252 B2 | | 8/2005 | Pierce |
| 7,008,465 B2 | | 3/2006 | Graham et al. |
| 7,137,510 B1 | | 11/2006 | Klein et al. |
| 7,144,633 B2 | | 12/2006 | Zguris et al. |
| 7,160,824 B2 | | 1/2007 | Zguris et al. |
| 7,314,497 B2 | | 1/2008 | Kahlbaugh et al. |
| 2002/0077243 A1 | | 6/2002 | Sircar |
| 2003/0015003 A1 | | 1/2003 | Fisler et al. |
| 2004/0116028 A1 | * | 6/2004 | Bryner ........................ 442/381 |
| 2007/0042171 A1 | | 2/2007 | Zguris et al. |
| 2007/0042172 A1 | | 2/2007 | Zguris et al. |
| 2010/0282083 A1 | * | 11/2010 | Edwards ......................... 95/285 |

FOREIGN PATENT DOCUMENTS

| | | |
|---|---|---|
| DE | 763 108 C | 5/1954 |
| DE | 44 17 230 A1 | 11/1995 |
| DE | 44 18 728 A1 | 1/1996 |
| DE | 44 18 727 A1 | 2/1996 |
| DE | 195 03 167 A1 | 8/1996 |
| EP | 0 738 693 A2 | 10/1996 |
| WO | WO 97/32926 A1 | 9/1997 |
| WO | WO 97/39990 A1 | 10/1997 |
| WO | WO 01/46078 A2 | 6/2001 |

OTHER PUBLICATIONS

International Search Report and Written Opinion for Application No. PCT/US2011/066756 mailed May 1, 2012.

* cited by examiner

*Primary Examiner* — Duane Smith
*Assistant Examiner* — Thomas McKenzie
(74) *Attorney, Agent, or Firm* — Wolf, Greenfield & Sacks, P.C.

(57) ABSTRACT

The present disclosure generally relates to filter media including glass fibers. The fiber characteristics (e.g., composition, dimensions) are selected to impart the desired solubility, filtration and mechanical properties so that the filter media may be used in the desired application.

17 Claims, No Drawings

FILTER MEDIA INCLUDING GLASS FIBERS

FIELD OF INVENTION

Aspects described herein relate generally to filter media that comprise glass fibers and which exhibit desirable properties.

BACKGROUND

Filter media can be used to remove contamination in a variety of applications. The media can include a web of fibers. The fiber web provides a porous structure that permits fluid (e.g., gas, air) to flow through the filter media. Contaminant particles contained within the fluid may be trapped on the fiber web.

The fiber characteristics (e.g., composition, dimensions) and filter media characteristics (e.g., basis weight, pore size, thickness) can affect the filtration properties (e.g., efficiency, resistance to fluid flow through the media) and mechanical properties (e.g., tensile properties, flex properties) of the media. Depending on the application in which the filter media is used, the media may be designed to meet certain filter property and/or mechanical property requirements.

The filter media fiber can be formed of a variety of materials including glass. In certain filter media applications, humans may be exposed to glass fiber fragments (e.g., one or more fibers, portions of fibers) which may be separated from the filter media during use. For example, such fiber fragments may be inhaled by humans and introduced into the body. For health and safety reasons, it can be preferable for the glass fibers to be soluble in biological fluids, particularly when there is a risk of such exposure. These fibers may dissolve, completely or in part, when present in the body, thus, reducing the risk of health and safety problems which may otherwise arise.

However, when forming filter media from glass fibers that exhibit biosoluble properties, it is important and can be challenging to meet the filtration and mechanical property requirements for certain applications in which the media is used.

SUMMARY OF THE INVENTION

Filter media as well as related components and methods are described herein.

In one aspect, a filter media is provided. The filter media comprises a fiber web. The fiber web includes a plurality of glass fibers having an average diameter of less than about 3.0 microns and a BaO content greater than about 7.2 wt %.

In another aspect, a plurality of glass fibers is provided. The glass fibers have an average diameter of less than about 3 microns and a BaO content of greater than about 7.2 wt %.

In a further aspect, a filter media is provided. The filter media comprises a fiber web that includes a plurality of glass fibers having a BaO content of greater than about 7.2 wt % and an alumina content of less than about 3.0 wt %.

In yet another aspect, a filter media is provided. The filter media includes a fiber web. The fiber web includes a plurality of glass fibers having a BaO content of greater than about 7.2 wt %, a total alkali oxide content of greater than about 10.0 wt %, and a total alkaline earth oxide content of less than about 20.0 wt %.

In a different aspect, a method of filtering a fluid is provided. The method includes flowing a fluid through a filter media comprising a fiber web. The fiber web includes a plurality of glass fibers having an average diameter of less than about 3.0 microns and a BaO content greater than about 7.2 wt %.

Other aspects, embodiments, advantages and features of the invention will become apparent from the following detailed description.

DETAILED DESCRIPTION

The present disclosure generally relates to filter media including glass fibers. As described further below, the fiber characteristics (e.g., composition, dimensions) are selected to impart the filter media with desired properties which can include biosoluble characteristics, as well as excellent mechanical and filtration properties. In embodiments in which the glass fibers exhibit biosoluble characteristics, they may be dissolved, at least to some extent, in certain body fluids. This reduces the risk of health and safety problems which otherwise may result from the presence of glass fibers in the body. Consequently, filter media made from such glass fibers may be particularly useful in applications that involve some risk of human exposure to glass fiber fragments that may be separated from the media. It should also be understood that, in some embodiments, the glass fibers described herein may be useful in applications other than filtration, for example, insulation applications, such as cryogenic insulation.

In general, the filter media includes a plurality of fibers which are assembled together in a fiber web. The fiber webs described herein include glass fibers, though it should also be understood that other fiber types may also be present including polymeric fibers and cellulosic fibers. In general, glass fibers constitute the majority (by weight) of the fibers in the fiber web. In some cases, more than one type of glass fiber may be used. When more than one glass fiber type is present in the filter media, each of the glass fiber types may have characteristics (e.g., composition, dimensions) described herein; or, in some cases, one (or more) of the glass fiber types may have characteristics described herein and one (or more) of the glass fiber types may have characteristics (e.g., composition, dimensions) that are not described herein.

The composition of the glass fibers may be selected to impart desired properties including biosoluble characteristics. The glass fibers generally comprise silica ($SiO_2$) and one or more of the following compounds: barium oxide (BaO), alumina ($Al_2O_3$), alkali oxide(s) (e.g., $Li_2O$, $Na_2O$, $K_2O$), alkaline earth oxide(s) (e.g., BeO, MgO, CaO, BaO), zinc oxide (ZnO) and boron oxide ($B_2O_3$). It should be understood that not each of these compounds is present in the glass fibers in every embodiment, though typically the fibers include a mixture of at least several of these compounds.

In certain embodiments, the glass fibers comprise BaO which may be important in imparting biosoluble characteristics and suitable mechanical properties (e.g., tensile strength, tensile elongation) to the fibers. In some embodiments, the glass fibers have a BaO content of greater than about 7.2 wt %, greater than about 7.3 wt %, greater than about 7.4 wt %, greater than about 7.5 wt %, greater than about 7.6 wt %, greater than about 7.7 wt %, greater than about 7.8 wt %, greater than about 7.9 wt %, etc.; in some embodiments, greater than about 8.0 wt %, greater than about 8.1 wt %, greater than about 8.2 wt %, greater than about 8.3 wt %, greater than about 8.4 wt %, or greater than about 8.5 wt %; in some embodiments, greater than about 9.0 wt %, or greater than about 9.5 wt %; and, in some embodiments, greater than about 10.0 wt %, or greater than about 10.5 wt %. In some embodiments, the BaO content may be less than about 25.0 wt %; less than about 20.0 wt %; less than about 15.0 wt %; or less than about 10.0 wt %. It should be understood that the glass fibers may have a BaO content within any of the above-noted upper and lower limits. For example, glass fibers may have a BaO content between about 7.2 wt % and about 25.0 wt %, between about 7.3 wt % and about 25.0 wt %, between about 7.4 wt % and about 25.0 wt %, between about 7.5 wt % and about 25.0 wt %, between about 7.6 wt % and about 25.0 wt %, between about 7.7 wt % and about 25.0 wt %, between about 7.8 wt % and about 25.0 wt %, between about 7.9 wt % and about 25.0 wt %, etc. Glass fibers may also have a BaO content between about 8.0 wt % and about 25.0 wt %, between about 8.1 wt % and about 25.0 wt %, between about 8.2 wt % and about 25.0 wt %, between about 8.3 wt % and about 25.0 wt %, between about 8.4 wt % and about 25.0 wt %, between about 8.5 wt % and about 25.0 wt %, between about 8.0 wt % and about 20.0 wt %, between about 8.0 wt % and about 15.0 wt %, between about 8.0 wt % and about 10.0 wt %, etc.).

It should be understood that the BaO content may be outside the above-noted ranges, in some embodiments.

In some embodiments, the glass fibers comprise alumina which may be important in imparting biosoluble characteristics and suitable mechanical properties. In some cases, the alumina content in the glass fibers may be greater than about 0.5 wt %; in some cases, greater than about 1.0 wt %; in some cases, greater than about 1.5 wt %; in some cases, greater than about 2.0 wt %; in some cases, greater than about 2.5 wt %; in some cases, greater than about 3.0 wt %; in some cases, greater than about 4.0 wt %; in some cases, greater than about 5.0 wt %; and in some cases, greater than about 5.5 wt % The glass fibers may have an alumina content of less than about 10 wt %; in some embodiments, less than about 9.0 wt %; in some embodiments, less than about 8.0 wt %; in some embodiments, less than about 7.0 wt %; in some embodiments, less than about 6.0 wt %; in some embodiments, less than about 5.0 wt %; in some embodiments, less than about 4.0 wt %; in some embodiments, less than about 3.5 wt %; in some embodiments, less than about 3.0 wt %; in some embodiments, less than about 2.5 wt %. It should be understood that the glass fibers may have an alumina content within any of the above-noted upper and lower limits (e.g., between about 0.5 wt % and about 10.0 wt %, between about 0.5 wt % and about 6.0 wt %, between about 0.5 wt % and about 3.0 wt %, between about 2.0 wt % and about 6.0 wt %, between about 5.0 wt % and about 6.0 wt %, between about 1.0 wt % and about 2.5 wt %, etc).

It should be understood that the alumina content may be outside the above-noted ranges, in some embodiments.

In general, the glass fibers may include one or more alkali oxide(s). For example, the presence of an alkali oxide may facilitate aspects of processing such as enabling lower melt temperatures. Examples of alkali oxides include $Li_2O$, $Na_2O$, $K_2O$, $Rb_2O$, and $Cs_2O$. In some cases, $Na_2O$ and/or $K_2O$ may be preferred alkali oxides. In some embodiments, the glass fibers have a total alkali oxide content (i.e., the content of all alkali oxides present added together) of greater than about 6.0 wt %; in some embodiments, greater than about 8.0 wt %; in some embodiments, greater than about 10.0 wt %; in some embodiments, greater than about 12.0 wt %; and, in some embodiments, greater than about 15.0 wt %. In some embodiments, the glass fibers have a total alkali oxide content of less than about 25.0 wt %; in some embodiments, less than about 20.0 wt %; in some embodiments, less than about 15.0 wt %; and, in some embodiments, less than about 12.0 wt %. It should be understood that the glass fibers may have an alkali oxide content within any of the above-noted upper and lower limits (e.g., between about 6.0 wt % and about 25.0 wt %, between about 8.0 wt % and about 20.0 wt %, between about 10.0 wt % and about 15.0 wt %, etc).

It should be understood that the alkali oxide content may be outside the above-noted ranges, in some embodiments.

As noted above, $Na_2O$ may be a preferred alkali oxide for use in the glass fibers. In some embodiments, the glass fibers have a $Na_2O$ content of greater than about 6.0 wt %; in some embodiments, greater than about 8.0 wt %; in some embodiments, greater than about 9.0 wt %; in some embodiments, greater than about 10.0 wt %; in some embodiments, greater than about 12.0 wt %; and, in some embodiments, greater than about 15.0 wt %. In some embodiments, the glass fibers have a $Na_2O$ content of less than about 25.0 wt %; in some embodiments, less than about 20.0 wt %; in some embodiments, less than about 15.0 wt %; in some embodiments, less than about 12.0 wt %; in some embodiments, less than about 11.0 wt %; and, in some embodiments, less than about 10.0 wt %. It should be understood that the glass fibers may have a $Na_2O$ content within any of the above-noted upper and lower limits (e.g., between about 6.0 wt % and about 25.0 wt %, between about 8.0 wt % and about 20.0 wt %, between about 9.0 wt % and about 15.0 wt %, between about 10.0 wt % and about 11.0 wt %, etc).

It should be understood that the $Na_2O$ content may be outside the above-noted ranges, in some embodiments.

As noted above, $K_2O$ may be a preferred alkali oxide for use in the glass fibers. The glass fibers may have a $K_2O$ content of greater than about 0.5 wt %; in some embodiments, greater than about 1.0 wt %; in some embodiments, greater than about 1.2 wt %; in some embodiments, greater than about 1.4 wt %; in some embodiments, greater than about 1.5 wt %; and, in some embodiments, greater than about 1.6 wt %. In some embodiments, the glass fibers have a $K_2O$ content of less than about 8.0 wt %; in some embodiments, less than about 5.0 wt %; in some embodiments, less than about 3.0 wt %; in some embodiments, less than about 2.0 wt %; in some embodiments, less than about 1.8 wt %; in some embodiments, less than about 1.7 wt %; in some embodiments, less than about 1.6 wt %; and, in some embodiments, less than about 1.5 wt %. It should be understood that the glass fibers may have a $K_2O$ content within any of the above-noted upper and lower limits (e.g., between about 0.5 wt % and about 8.0 wt %, between about 1.0 wt % and about 3.0 wt %, between about 1.5 wt % and about 2.0 wt %, etc).

It should be understood that the $K_2O$ content may be outside the above-noted ranges, in some embodiments.

The glass fibers may also include one or more alkaline earth oxide(s). Examples of alkaline earth oxides include BeO, MgO, CaO, SrO and BaO. In addition to BaO, described above, MgO and/or CaO may be preferred alkaline earth oxides. In some embodiments, the glass fibers have a total alkaline earth oxide content (i.e., the content of all alkaline earth oxides added together) of greater than about 6.0 wt %; in some embodiments, greater than about 8.0 wt %; in some embodiments, greater than about 10.0 wt %; and, in some embodiments, greater than about 12.0 wt %. The total alkaline earth oxide content may be less than about 25.0 wt %; in some cases, less than about 20.0 wt %; in some cases, less than about 15.0 wt %; and, in some embodiments, less than about 13.0 wt %. It should be understood that the glass fibers may have an alkaline earth oxide content within any of the above-noted upper and lower limits (e.g., between about 6.0 wt % and about 25.0 wt %, between about 8.0 wt % and about 20.0 wt %, between about 10.0 wt % and about 15.0 wt %, etc).

It should be understood that the alkaline earth oxide content may be outside the above-noted ranges, in some embodiments.

In some embodiments, the glass fibers may have a MgO content of greater than about 0.1 wt %; in some embodiments, greater than about 0.2 wt %; in some embodiments, greater than about 0.3 wt %; in some embodiments, greater than about 0.4 wt %; and in some embodiments, greater than about 0.5 wt %. In some embodiments, the glass fibers have a MgO content of less than about 8.0 wt %; in some embodiments, less than about 5.0 wt %; in some embodiments, less than about 3.0 wt %; in some embodiments, less than about 2.0 wt %; in some embodiments, less than about 1.0 wt %; in some embodiments, less than about 0.8 wt %; in some embodiments, less than about 0.6 wt %; in some embodiments, less than about 0.5 wt %; and, in some embodiments, less than about 0.4 wt %. It should be understood that the glass fibers may have a MgO content within any of the above-noted upper and lower limits (e.g., between about 0.1 wt % and about 8.0 wt %, between about 0.2 wt % and about 2.0 wt %, between about 0.3 wt % and about 1.0 wt %, between about 0.4 wt % and about 0.6 wt %, etc).

It should be understood that the MgO content may be outside the above-noted ranges, in some embodiments.

The glass fibers may have a CaO content of greater than about 0.1 wt %; in some embodiments, greater than about 0.5 wt %; in some embodiments, greater than about 1.0 wt %; in some embodiments, greater than about 1.5 wt %; in some embodiments, greater than about 1.8 wt %; and in some embodiments, greater than about 2.0 wt %. In some embodiments, the glass fibers have a CaO content of less than about 15.0 wt %; in some embodiments, less than about 10.0 wt %; in some embodiments, less than about 5.0 wt %; in some embodiments, less than about 4.0 wt %; in some embodiments, less than about 3.0 wt %; in some embodiments, less than about 2.5 wt %; in some embodiments, less than about 2.2 wt %; in some embodiments, less than about 2.1 wt %; and, in some embodiments, less than about 2.0 wt %. It should be understood that the glass fibers may have a CaO content within any of the above-noted upper and lower limits (e.g., between about 0.1 wt % and about 15.0 wt %, between about 1.0 wt % and about 10.0 wt %, between about 1.5 wt % and about 5.0 wt %, between about 1.8 wt % and about 2.2 wt %, etc).

It should be understood that the CaO content may be outside the above-noted ranges, in some embodiments.

In some embodiments, the glass fibers may include ZnO. In some cases, the ZnO content in the glass fibers is greater than about 1.5 wt %; in some cases, greater than about 2.0 wt %; in some cases, greater than about 2.5 wt %; in some cases, greater than about 3.0 wt %; in some cases, greater than about 3.5 wt %; and in some cases, greater than about 4.0 wt %. The ZnO content may be less than about 8.0 wt %; in some cases, less than about 6.0 wt %; in some cases, less than about 5.0 wt %; in some cases, less than about 4.5 wt %; in some cases, less than about 4.0 wt %; and, in some embodiments, less than about 3.5 wt %. It should be understood that the glass fibers may have a ZnO content within any of the above-noted upper and lower limits (e.g., between about 1.5 wt % and about 8.0 wt %, between about 2.5 wt % and about 6.0 wt %, between about 2.5 wt % and about 5.0 wt %, between about 3.0 wt % and about 4.5 wt %, etc).

It should be understood that the ZnO content may be outside the above-noted ranges, in some embodiments.

The glass fibers may include $B_2O_3$. In some cases, the $B_2O_3$ content in the glass fibers may be greater than about 5.0 wt %; in some cases, greater than about 8.0 wt %; in some cases, greater than about 9.0 wt %; in some cases, greater than about 10.0 wt %; and, in some cases, greater than about 11.0 wt %. The $B_2O_3$ content may be less than about 15.0 wt %; less than about 13.0 wt %; less than about 12.0 wt %; and, in some embodiments, less than about 11.0 wt %. It should be understood that the glass fibers may have a $B_2O_3$ content within any of the above-noted upper and lower limits (e.g., between about 5.0 wt % and about 15.0 wt %, between about 8.0 wt % and about 13.0 wt %, between about 10.0 wt % and about 12.0 wt %, etc).

It should be understood that the $B_2O_3$ content may be outside the above-noted ranges, in some embodiments.

As described above, generally, the glass fibers include a suitable amount of silica. Silica generally is the major component by weight in the glass fibers. For example, the silica content may be greater than about 45.0 wt %; in some cases, greater than about 50.0 wt %; in some cases, greater than about 55.0 wt %; in some cases, greater than about 60.0 wt %; and, in some cases, greater than about 65.0 wt %. The silica content may be less than about 80.0 wt %; in some cases, less than about 75.0 wt %; in some cases, less than about 65.0 wt %; and, in some cases, less than about 55.0 wt %. It should be understood that the glass fibers may have a silica content within any of the above-noted upper and lower limits (e.g., between about 45.0 wt % and about 80.0 wt %, between about 55.0 wt % and about 70.0 wt %, between about 60.0 wt % and about 65.0 wt %, etc).

It should be understood that the silica content may be outside the above-noted ranges, in some embodiments.

It should be understood that the glass fibers may include any combination of the above-described components within any of the suitable weight contents that are described above. For example, the fibers may include a BaO content of greater than about 7.2 wt % (or 7.3 wt % or 7.4 wt % or 7.5 wt % or 7.6 wt % or 7.7 wt % or 7.8 wt % or 7.9 wt % or 8.0 wt %, etc.) of the fiber web and an alumina content of less than about 3.0 wt %; and, in some embodiments, the glass fibers may include a BaO content of greater than about 7.2 wt % (or 7.3 wt % or 7.4 wt % or 7.5 wt % or 7.6 wt % or 7.7 wt % or 7.8 wt % or 7.9 wt % or 8.0 wt %, etc.), a total alkali oxide content of greater than about 10.0 wt % and an alkaline earth oxide content of less than about 20.0 wt %; etc. In another example, the glass fibers may include a BaO content of between about 7.2 wt % (or 7.3 wt % or 7.4 wt % or 7.5 wt % or 7.6 wt % or 7.7 wt % or 7.8 wt % or 7.9 wt % or 8.0 wt % etc.) and about 25.0 wt %, an alumina content of between about 0.5 wt % and about 10.0 wt %; a total alkali oxide content of between about 6.0 wt % and about 25.0 wt %, a total alkaline earth oxide content of between about 6.0 wt % and about 25.0 wt %, a ZnO content of between about 1.5 wt % and about 8.0 wt %, a $B_2O_3$ content of between about 5.0 wt % and about 15.0 wt %, and a silica content of between about 45.0 wt % and about 80.0 wt %, etc. In yet another example, the glass fibers may include a BaO content of between about 7.2 wt % (or 7.3 wt % or 7.4 wt % or 7.5 wt % or 7.6 wt % or 7.7 wt % or 7.8 wt % or 7.9 wt % or 8.0 wt %, etc.) and about 20.0 wt %, an alumina content of between about 1.0 wt % and about 2.5 wt %, a total alkali oxide content of between about 10.0 wt % and about 15.0 wt %, a total alkaline earth oxide content of between about 10.0 wt % and about 15.0 wt %, a ZnO content of between about 3.0 wt % and about 4.5 wt %, a $B_2O_3$ content of between about 10.0 wt % and about 12.0 wt %, and a silica content of between about 60.0 wt % and about 65.0 wt %, etc.

For some embodiments, the glass fibers may include a BaO content of between about 7.2 wt % (or 7.3 wt % or 7.4 wt % or 7.5 wt % or 7.6 wt % or 7.7 wt % or 7.8 wt % or 7.9 wt % or 8.0 wt %, etc.) and about 25.0 wt %, an alumina content of between about 0.5 wt % and about 10.0 wt %; a $Na_2O$ content of between about 6.0 wt % and about 25.0 wt %, a $K_2O$ content of between about 0.5 wt % and about 8.0 wt %, a MgO content of between about 0.1 wt % and about 8.0 wt %, a CaO content of between about 0.1 wt % and about 15.0 wt %, a ZnO content of between about 1.5 wt % and about 8.0 wt %, a $B_2O_3$ content of between about 5.0 wt % and about 15.0 wt %, and a silica content of between about 45.0 wt % and about 80.0 wt %, etc. For example, the glass fibers may include a BaO content of between about 7.2 wt % and about 20.0 wt %, an alumina content of between about 1.0 wt % and about 2.5 wt %, a $Na_2O$ content of between about 10.0 wt % and about 11.0 wt %, a $K_2O$ of between about 1.5 wt % and about 2.0 wt %, a MgO content of between about 0.4 wt % and about 0.6 wt %, a CaO content of between about 1.8 wt % and about 2.2 wt %, a ZnO content of between about 3.0 wt % and about 4.5 wt %, a $B_2O_3$ of between about 10.0 wt % and about 12.0 wt %, and a silica content of between about 60.0 wt % and about 65.0 wt %, etc.

It should be understood that the glass fibers may be analyzed using Inductively Coupled Plasma Spectrophotography (ICP) analysis, as performed according to Battery Council International (BCI) Procedure XIIB, to determine their composition including the weight percentage of each component.

In general, the glass fibers used in the filter media described herein may have any suitable dimensions. In some embodiments, the glass fibers have an average diameter of less than about 10.0 microns. In some cases, it may be preferred for the glass fibers to have an average diameter of less than about 3.0 microns. In some cases, the glass fibers have an average diameter of less than about 2.0 microns, less than about 1.5 microns, less than about 1.0 micron, or less than about 0.5 microns. The average diameter of the glass fibers may be greater than about 0.1 microns; in some embodiments, greater than about 0.5 microns; in some embodiments, greater than about 1.0 microns; in some embodiments, greater than about 1.5 microns; and, in some embodiments, greater than about 2.0 microns. It should be understood that the glass fibers may have an average diameter within any of the above-noted upper and lower limits (e.g., between about 0.1 microns and about 3.0 microns, etc.).

The glass fibers may vary in length as a result of process variations. The aspect ratios (length to diameter ratio) of the glass fibers may be generally in the range of about 10 to about 10,000. In some embodiments, the aspect ratio of the glass fibers may be in the range of about 100 to about 2500; or, in the range of about 200 to about 1000; or, in the range of about 300 to about 600. In some embodiments, the average aspect ratio of the glass fibers may be about 1,000; or about 300. It should be appreciated that the above-noted dimensions are not limiting and that the glass fibers may also have other dimensions.

In some embodiments, the average length of glass fibers in a filter media may generally be between about 0.1 mm and about 5.0 mm, or for example, between about 2 mm and about 4 mm. It should be appreciated that the above-noted dimensions are not limiting and that the glass fibers may also have other dimensions.

The glass fibers may have a suitable surface area as measured through BET Surface Area Analysis (SSA) in accordance with method number 8 (Surface Area) of Battery Council International Standard BCIS-03A (2009 revision), "BCI Recommended Test Methods VRLA AGM Battery Separators." With this technique, the BET surface area is measured via an adsorption analysis using a BET surface analyzer (e.g., Micromeritics Gemini II 2370 Surface Area Analyzer) with nitrogen gas. The sample amount measured is between 0.5 and 0.6 grams in a ¾ inch tube; and, the sample is allowed to degas at 75° C. for a minimum of 3 hours.

In some embodiments, the surface area of the glass fibers may be greater than about 0.1 $m^2/g$, greater than about 0.5 $m^2/g$, greater than about 1.0 $m^2/g$, greater than about 1.5 $m^2/g$, greater than about 2.0 $m^2/g$, greater than about 3.0 $m^2/g$, greater than about 4.0 $m^2/g$, greater than about 5.0 $m^2/g$, greater than about 6.0 $m^2/g$, or greater than about 6.5 $m^2/g$. In some cases, the surface of the glass fibers may range between about 0.1 $m^2/g$ and about 10.0 $m^2/g$, between about 0.1 $m^2/g$ and about 8.5 $m^2/g$, between about 0.1 $m^2/g$ and about 6.5 $m^2/g$, between about 0.1 $m^2/g$ and about 3.0 $m^2/g$, or between about 0.1 $m^2/g$ and about 2.8 $m^2/g$ The glass fibers may be any suitable kind of glass fiber. For example, the glass fibers can be microglass fibers. Microglass fibers are drawn from bushing tips and further subjected to flame blowing or rotary spinning processes. In some cases, microglass fibers may be made using a remelting process. In some embodiments, the glass fibers can include chopped strand glass fibers.

In addition to the fibers described above, the filter media may include a binder. In some embodiments, a binder coats the glass fibers, adhering fibers to each other and facilitating adhesion between the fibers. A binder that adheres fibers together may have any suitable composition and may be provided as any suitable percentage of the filter media. In some embodiments, a binder of the filter media may include polyester, polyolefin, polyurethane, polyvinyl acetate, polyvinyl alcohol, polyacrylic acid, acrylic, styrene, styrene acrylic, or combinations thereof The filter media may include an amount of binder between about 0 wt % and about 20 wt %, between about 1 wt % and about 19 wt %, between about 1 wt % and about 10 wt %, or between about 2 wt % and about 5 wt %, etc.

The filter media may also include a variety of other suitable additives (typically, in small weight percentages) such as, fluorocarbon polymer, surfactants, coupling agents, and crosslinking agents, amongst others. The media may also include other components such as a substrate, additional fiber webs, binder materials and the like.

As discussed above, for some cases, such as for health and safety reasons, it may be beneficial for filter media to exhibit biosoluble properties. The degree of biosolubility of the glass fibers in the media may be determined by measuring Kdis which is an assessment of the rate of fiber dissolution in $ng/hour/cm^2$. Kdis may be measured by immersing 0.25 grams of the fibers for 28 days in a physiological fluid (e.g., Gamble fluid) at a temperature of 37° C. and at a flow rate of 0.25 mL/min. Fibers are held in a thin layer between 0.4 micron polycarbonate membranes supported by a plastic support mesh and the assembly is placed within a polycarbonate sample cell through which fluid may percolate. The pH of the fluid is maintained to be 7.4+/−0.2 (e.g., through the use of a 5% $CO_2$ and 95% $N_2$ positive pressure bubbled through the fluid). Weight losses are measured using ICP collected at specified time intervals (e.g., once per week). The total weight loss is calculated based on the difference between the final and initial weight of the fiber sample. As a control for test accuracy, reference fibers with known Kdis values are also measured. Kdis values are calculated based on the following formula:

$$K\text{dis} = [d_0 \rho (I - (M/M_0)^{0.5})]/2t$$

where $d_0$ is the initial fiber diameter, $\rho$ is the initial density of the fiber, $M_0$ is the initial mass of the fibers, M the final mass of the fibers, and t is the time over which the measurement was made.

In some embodiments, the glass fibers have a Kdis of greater than about 85 ng/hour/cm$^2$; in some embodiments, the Kdis may be greater than about 90 ng/hour/cm$^2$; in some embodiments, the Kdis may be greater than about 95 ng/hour/cm$^2$; in some embodiments, the Kdis may be greater than about 100 ng/hour/cm$^2$; in some embodiments, the Kdis may be greater than about 110 ng/hour/cm$^2$; in some embodiments, the Kdis may be greater than about 115 ng/hour/cm$^2$; in some embodiments, the Kdis may be greater than about 130 ng/hour/cm$^2$; and, in some embodiments, the Kdis may be greater than about 150 ng/hour/cm$^2$. Further, the glass fibers may have a Kdis of between about 85 ng/hour/cm$^2$ and about 200 ng/hour/cm$^2$, between about 90 ng/hour/cm$^2$ and about 150 ng/hour/cm$^2$, between about 95 ng/hour/cm$^2$ and about 130 ng/hour/cm$^2$, or between about 100 ng/hour/cm$^2$ and about 110 ng/hour/cm$^2$.

In general, the filter media can have varying basis weights, pore sizes, thicknesses, permeabilities, dirt holding capacities, efficiencies, and pressure drops, depending upon the requirements of a desired application. Representative values and ranges for some of these characteristics are provided in the following paragraphs. However, it should be understood that these values and ranges are not limiting and that certain embodiments may not have values and ranges outside those described below. It should also be understood that though values and ranges are provided for filter media, the same values and ranges may apply to fiber web(s) described herein.

In general, the filter media may have any suitable basis weight. For example, basis weight of the filter media may range from between about 5 grams per square meter (gsm) and about 1000 gsm, between about 25 gsm and about 150 gsm, or between about 55 gsm and about 85 gsm, etc. The basis weight of the filter media is measured according to the Technical Association of the Pulp and Paper Industry (TAPPI) Standard T410.

The filter media may generally have any suitable thickness. Suitable thicknesses of the filter media may include, but are not limited to, between about 0.05 mm and about 100.0 mm, between about 0.10 mm and about 10.0 mm, between about 0.20 mm and about 0.90 mm, or between about 0.25 mm and about 0.50 mm, etc. Thickness is determined according to TAPPI T411 using an appropriate caliper gauge (e.g., electronic or mechanical microgauge, tested at 7.3 psi load).

In general, the filter media may exhibit excellent mechanical properties (e.g., tensile, flex properties) that enable it to be used in the desired application. Mechanical properties can be measured in terms of machine direction and cross-machine direction which have usual meanings in the art. That is, a machine direction is referred to as a direction in which the fiber web moves along the machine during processing. A cross-machine direction is referred to as a direction perpendicular to the machine direction.

In some embodiments, the tensile strength of the filter media in the machine direction may be greater than about 5 inches/lb, greater than about 6 inches/lb; or in some cases, greater than about 7 inches/lb. For example, the tensile strength of the filter media in the machine direction may range between about 5 inches/lb and about 20 inches/lb, or between about 7 inches/lb and about 10 inches/lb, etc. The tensile strength of the filter media in the cross-machine direction may be greater than about 2 inches/lb; and, in some cases, greater than about 4 inches/lb. In some embodiments, the tensile strength of the filter media in the cross-machine direction may range between about 2 inches/lb and about 20 inches/lb, or between about 4 inches/lb and about 10 inches/lb, etc.

The tensile elongation of the filter media in the machine direction may be greater than about 0.8%; and, in some cases, greater than about 1.0%. For example, the tensile elongation of the filter media in the machine direction may be between about 0.8% and about 5.0%, and, in some cases, between about 1.0% and about 3.0%, etc. The tensile elongation of the filter media in the cross-machine direction may be greater than about 1.5%; and, in some cases, greater than about 1.8%. In some embodiments, the tensile elongation of the filter media in the cross-machine direction may be between about 1.5% and about 8.0%, between about 1.8% and about 5.0%, and, in some cases, between about 2.0% and about 3.0%, etc.

Tensile strength and elongation are measured following TAPPI T 1009 "Tensile strength and elongation at break."

In some embodiments, the flex tensile strength of the filter media in the machine direction may be greater than about 2.0 inches/lb, greater than about 3.0 inches/lb, or greater than about 3.5 inches/lb. For example, the flex tensile strength of the filter media in the machine direction may be between about 1.0 inches/lb and about 10.0 inches/lb, in some cases, between about 2.0 inches/lb and about 8.0 inches/lb, and, in some cases, between about 3.5 inches/lb. and about 5.0 inches/lb, etc. The flex tensile elongation of the filter media in the machine direction may be greater than about 0.2%, greater than about 0.3%, or greater than about 0.4%. In some embodiments, the flex tensile elongation of the filter media in the machine direction may range between about 0.1% and about 5.0%, between about 0.2% and about 3.0%, and, in some cases, between about 0.4% and about 1.0%, etc.

The flex tensile strength and flex elongation of the filter media in the machine direction of the filter media was measured under a temperature of 50° C. and a relative humidity of 90%, also known as humid aging conditions. When subject to humid aging conditions, the filter media may advantageously retain its tensile strength properties over time. For example, in some embodiments, after a 96 hour period subject to humid aging conditions, the flex tensile strength decreases by an amount less than about 50%; in some embodiments, the flex tensile strength decreases by an amount less than about 40%; in some embodiments, the flex tensile strength decreases by an amount less than about 30%; and in some embodiments, the flex tensile strength decreases by an amount, less than about 20%; in some embodiments, the flex tensile strength decreases by an amount between about 5% and about 50%; in some embodiments, the flex tensile strength decreases by an amount between about 10% and about 40%, between 15% and about 30%, or between about 15% and about 20%. In some embodiments, after 96 hours subject to humid aging conditions, the flex elongation decreases by an amount less than about 40%; in some embodiments, the flex elongation decreases by an amount less than about 30%; in some embodiments, the flex elongation decreases by an amount less than about 25%; in some embodiments, the flex elongation decreases by an amount less than about 20%; in some embodiments, the flex elongation decreases by an amount between about 5% and about 40%; in some embodiments, the flex elongation decreases by an amount between about 10% and about 30%; in some embodiments, the flex elongation decreases by an amount between about 15% and about 25%; in some embodiments, the flex elongation decreases by an amount between about 15% and about 20%. The flex tensile strength and flex elongation are measured according to TAPPI T 1010 "Flexibility Index of Fiber Glass Mats." In a flex tensile strength and flex elongation measurement, one sample of filter media is flexed 180 degrees over a ⅛ inch mandrel such that one of the samples is flexed wire to wire (upstream to upstream side), the other sample is flexed felt to felt (downstream to downstream side), and the average of measurements from the two samples is recorded. The load failure in measuring the flex tensile strength is determined at a 4 inch gauge length.

In some embodiments, the stiffness of the filter media in the machine direction may be greater than about 500 mg; and in some cases, the stiffness is greater than about 600 mg. For example, the stiffness of the filter media in the machine direction may range between about 500 mg and about 2000 mg, between about 600 mg and about 1000 mg, or between about 600 mg and about 800 mg. In some instances, the stiffness of the filter media in the cross-machine direction may be greater than about 150 mg; and, in some cases, greater than about 350 mg. In some embodiments, the stiffness of the filter media in the cross-machine direction may range between about 150 mg and about 1500 mg, between about 300 mg and about 800 mg, or between about 350 mg and about 500 mg. Stiffness of the filter media is measured according to TAPPI Standard T 543.

In general, filter media described herein can be formed by any suitable process. To form the glass fibers, raw materials (e.g., particles of BaO, silica, alumina, alkali oxides, alkaline earth oxides, ZnO, $B_2O_3$), can be mixed together and heated in a furnace (e.g., to a temperature between 2400-2700° F.) so that the materials melt and form a homogeneous mixture. Once the materials are suitably combined together, the mixture may be fiberized. In some embodiments, the mixture is melted and formed into glass material (e.g., in the form of patties, marbles, pellets), which are then fiberized through a flame blown system.

In an exemplary embodiment of a flame blown system, a mixture of glass material is heated to a temperature sufficient for the glass material to form a viscous melt. Using a suitable pulling guide system, the viscous melt is then drawn into coarse glass filaments. The coarse glass filaments are subsequently subjected to a high temperature gas jet flame, remelting the coarse glass filament to form fine glass fibers. In some cases, the high temperature gas jet flame impinges upon the coarse glass filaments at generally a right angle to propel the resulting fine glass fibers through a forming tube. In some instances, the fine glass fibers may move through the forming tube via application of a vacuum suction system and on to a collection area. In some embodiments, although not necessarily required, a binder may be applied to the fibers (e.g., via spray application) as they pass through the forming tube toward the collection area. In the collection area, fibers may aggregate and entangle into a wool-like composition, which may then be weighed and baled, as appropriate for further processing.

In an exemplary embodiment of a rotary system, the glass material is mixed together and melted in a furnace to form a viscous glass melt. The viscous glass melt is introduced into a rotating spinner system. In some embodiments, a rotating spinner system includes a disc-like or bowl-like structure having perforated sidewalls and the spinner applies centrifugal forces to the glass melt so that the glass melt is extruded through the openings in the sidewall. Melt streams that arise from the glass melt extrusion are cooled to form fibers that, at times, may be smaller in diameter than the diameters of the extrusion holes. In some embodiments, though not all, a rotary system may include a burner for heating of the interior of the rotating spinner and the glass melt inside the spinner. In some cases, an annular burner surrounding the spinner may supply exhaust gases for heating sidewalls of the spinner and extruded streams of glass melt. Exhaust gases may also provide aerodynamic drag forces to assist in providing attenuation of the melt streams into fine glass fibers. Further, in some embodiments, an annular compressed air blower may be employed to provide aerodynamic attenuating forces so as to fragment fibers into shorter lengths and control movement of the fibers as they leave the fiberizing system. In some cases, as discussed above, fibers may be subject to a gas jet. Fine glass fibers may also have binder or other suitable material(s) applied (e.g., sprayed) onto the fibers prior to collection on a conveyor belt or other suitable collection device. Upon collection, fibers may be suitably weighed and baled.

While glass fibers described herein may be prepared by a flame blown process or a rotary process, it should be appreciated that suitable glass fibers can be prepared by any appropriate method. The fine glass fibers may be formed in bulk, processed and incorporated into filter media.

The filter media may be produced using processes based on known techniques. For example, the filter media may be produced using a wet laid process or a dry laid process.

In general, a wet laid process involves mixing together the fibers to provide a glass fiber slurry. In some cases, the slurry is an aqueous-based slurry. If mixtures of fibers (e.g., glass and polymeric fibers) are used, then the fibers may be processed through a pulper before being mixed together. In some embodiments, a combination of microglass and chopped strand glass fibers may be included in the glass fiber slurry, though chopped strand glass fibers are not required. It should be understood that not all glass fibers in the filter media are required to have the compositions described above as some glass fibers may have other suitable compositions.

It should be appreciated that any suitable method for creating a glass fiber slurry may be used. In some cases, additional additives are added to the slurry to facilitate processing. The temperature may also be adjusted to a suitable range, for example, between 33° F. and 100° F. (e.g., between 50° F. and 85° F.). In some embodiments, the temperature of the slurry is maintained. In some cases, the temperature is not actively adjusted.

In some embodiments, the wet laid process uses similar equipment as a conventional papermaking process, which includes a hydropulper, a former or a headbox, a dryer, and an optional converter. For example, the slurry may be prepared in one or more pulpers. After appropriately mixing the slurry in a pulper, the slurry may be pumped into a headbox, where the slurry may or may not be combined with other slurries or additives may or may not be added. The slurry may also be diluted with additional water such that the final concentration of fiber is in a suitable range, such as for example, between about 0.1% to 0.5% by weight.

In some cases, the pH of the glass fiber slurry may be adjusted as desired. For instance, the pH of the glass fiber slurry may range between about 1.5 and about 4.5, or between about 2.6 and about 3.2.

Before the slurry is sent to a headbox, the slurry may be passed through centrifugal cleaners for removing unfiberized glass or shot. The slurry may or may not be passed through additional equipment such as refiners or deflakers to further enhance the dispersion of the fibers. Fibers may then be collected on a screen or wire at an appropriate rate using any suitable machine, e.g., a fourdrinier, a rotoformer, a cylinder, or an inclined wire fourdrinier.

In some embodiments, the process involves introducing binder (and/or other components) into a pre-formed glass fiber layer. In some embodiments, as the glass fiber layer is passed along an appropriate screen or wire, different components included in the binder, which may be in the form of separate emulsions, are added to the glass fiber layer using a suitable technique. In some cases, each component of the binder resin is mixed as an emulsion prior to being combined with the other components and/or glass fiber layer. In some embodiments, the components included in the binder may be pulled through the glass fiber layer using, for example, gravity and/or vacuum. In some embodiments, one or more of the components included in the binder resin may be diluted with softened water and pumped into the glass fiber layer.

In other embodiments, a dry laid process is used. In a dry laid process, glass fibers are chopped and dispersed in air that is blown onto a conveyor, and a binder is then applied. Dry laid processing is typically more suitable for the production of highly porous media including bundles of glass fibers.

As previously indicated, the filter media disclosed herein can be incorporated into a variety of filter elements using known techniques. The filter elements may be used in various applications including, but not limited to, air filtration applications (e.g., HEPA, ULPA, low efficiency applications) and hydraulic filter media applications. For example, the filter media may be used in heating and/or air conditioning applications. In some cases, the filter element may include a housing that may be disposed around the filter media. The housing can have various configurations, with the configurations varying based on the intended application.

It should be understood that the filter media and filter elements may have a variety of different constructions and the particular construction depends on the application in which the filter media and elements are used.

EXAMPLES

The following three non-limiting examples describe filter media that exhibit characteristics described herein including high Kdis, as well as suitable mechanical and filtration properties.

Glass fibers were manufactured by heating a mixture of appropriate compounds in a furnace to melt the compounds forming a homogeneous blend. The blend was subsequently fiberized into one batch of fine glass fibers having an average diameter of 0.6 microns and a second batch of glass fibers having an average diameter of 3.0 microns. The compositions for these glass fibers are shown in Table 1 below.

TABLE 1

Weight and Molar Percentages of Components in Glass Fibers for Examples 1-3.

| | Example 1 (wt %) | Example 1 (mol %) | Example 2 (wt %) | Example 2 (mol %) | Example 3 (wt %) | Example 3 (mol %) |
|---|---|---|---|---|---|---|
| $SiO_2$ | 61.2 | 67.2 | 60.8 | 67.0 | 61 | 67.2 |
| $Al_2O_3$ | 2.1 | 1.4 | 2.4 | 1.6 | 1.3 | 0.8 |
| CaO | 2 | 2.3 | 2 | 2.3 | 2 | 2.3 |
| MgO | 0.4 | 0.7 | 0.5 | 0.8 | 0.4 | 0.7 |
| $B_2O_3$ | 10.5 | 9.9 | 11 | 10.4 | 10.5 | 10.0 |
| $K_2O$ | 1.5 | 1.0 | 1.8 | 1.3 | 1.5 | 1.1 |
| $Na_2O$ | 10.5 | 11.1 | 10 | 10.7 | 10 | 10.7 |
| ZnO | 3.4 | 2.8 | 2.5 | 2.0 | 4 | 3.2 |
| BaO | 8.4 | 3.6 | 9 | 3.9 | 9.3 | 4.0 |

Glass fiber webs were prepared from the above-described batches of glass fibers and chopped strand fibers (¼" Deltachop 8610E DE fibers obtained from Pittsburgh Plate and Glass Industries, Inc. having an average fiber diameter of 6.5 microns). The fiber webs were prepared on a pilot machine without resin binder and then saturated in the laboratory to produce a filter media prior to testing. The weight percentages of the glass fiber components in the filter media were as follows: 61% by weight 0.6 micron fibers, 30% by weight 3.0 micron fibers, and 9% by weight chopped strand fibers. A resin binder formulation having a batch size of 2500 mL with the composition provided in Table 2 was included in the fiber web.

TABLE 2

Resin Binder Formula

| Material | As Recorded (g) |
|---|---|
| H2O | 2433.3 |
| Rohm & Haas Rhoplex E32NP | 39.7 |
| Rohm & Haas Resin HF-05A | 17.6 |
| Asahi Glass Company Repearl F-35 | 9.4 |

Prior to testing, samples were cured for 3 minutes at 150° C. The Kdis of the glass fibers from Examples 1-3 was measured according to the methods described above after 7 days, 16 days and 28 days, and the values are recorded in Table 3 below.

TABLE 3

Biosolubility Characteristics Measured of Glass Fibers for Examples 1-3.

| | Example 1 | | | Example 2 | | | Example 3 | | |
|---|---|---|---|---|---|---|---|---|---|
| | 28 days | 16 days | 7 days | 28 days | 16 days | 7 days | 28 days | 16 days | 7 days |
| Kdis | 93.2 | 82.7 | 85.9 | 99.2 | 95.4 | 102.2 | 116.2 | 111.0 | 107.7 |

Mechanical properties of the filter media of Examples 1-3 were measured and are recorded in Table 4. The test procedures noted above in the Detailed Description were used to measure the properties. Filtration properties of the filter media of Examples 1-3 were also measured and are recorded in Table 4.

Penetration through the filter media was measured as a ratio of the particle concentration before passage through the filter and the particle concentration after passage through the filter, in accordance with ASTM Standard D2986. Two penetration tests were conducted. One penetration test involved blowing dioctyl phthalate (DOP) particles 0.3 microns in size through a filter media at 5.3 cm/sec. and measuring the percentage of particles that penetrate through the filter media. The other penetration test followed the same procedure using DOP particles 0.3 microns in size except traveling at a 2.5 cm/sec face velocity. Filter efficiency is defined as (100−Penetration %). Gamma provides a relationship between penetration and pressure drop across a filter, and is expressed according to the following:

gamma=(−log(Penetration %/100)/(pressure drop, mm $H_2O$)×100

The pressure drop across the filter media was measured using a resistance rig with no exposure to aerosol contaminants. The pressure drop was measured as the difference in pressure across the filter media during pure air flow through at a velocity of 5.3 centimeters per second, using a digital manometer.

Loss on ignition (LOI %) was measured according to reference test standard T1013 "Loss on Ignition of fiber glass mats." The LOI test determines the fraction of filter media that is volatile and non-glass where the weight of a sample of filter media is measured before and after being subjected to temperatures of 1000° F.+/−50° F. for a minimum of 2 minutes. The LOI % recorded in Table 4 is considered to be the binder content of the filter media.

The AC Flex Light Weight (AC Flex Lt Wt) was measured using an AC Flex Tester on a 2 inch by 4 inch sample cut with the 4 inch side aligned in the machine direction. The sample was clamped in a specimen holder. The tester was activated to cyclically flex the sample at a rate of 48 cycles per minute (+/−1 cycle) using a flex weight of 413.2 grams. The number of flex cycles until the specimen broke was recorded.

The water rise was measured according to MIL-STD-282 "Operation of the E1R3 Water-Repellency-Test Apparatus." In this test, the filter media is rigidly supported on one side with a 20 cm² area on the opposite side exposed to a water pressure that increases at a constant rate. The water repellency of the filter media is determined by the height of the water column necessary to cause penetration of water through the filter media.

TABLE 4

Mechanical and Performance Characteristics Measured of the Fiber Webs for Examples 1-3.

|  | Example 1 | Example 2 | Example 3 |
|---|---|---|---|
| Machine Direction Tensile Strength (inches/lb) | 7.43 | 6.81 | 5.30 |
| Machine Direction Elongation (%) | 1.16 | 1.19 | 0.93 |
| Cross Direction Tensile Strength (inches/lb) | 4.26 | 4.37 | 2.55 |
| Cross Direction Elongation (%) | 1.83 | 1.85 | 2.23 |
| Flex Tensile Strength (inches/lb) | 3.58 | 3.38 | 2.70 |
| Flex Elongation (%) | 0.40 | 0.42 | 0.41 |
| Machine Direction Stiffness (mg) | 644 | 576 | 500 |
| Cross Direction Stiffness (mg) | 364 | 280 | 196 |
| Basis Weight (lb/ream) | 43.5 | 40.3 | 40.1 |
| 50 kPa Caliper (inches) | 0.0116 | 0.0107 | 0.0113 |
| LOI (%) | 5.6 | 5.9 | 6.0 |
| ΔP, 5.3 cm/sec (mm H₂O) | 40.7 | 32.4 | 32.5 |
| DOP Penetration, 5.3 cm/sec (%) | 0.0007 | 0.0070 | 0.0063 |
| DOP Penetration, 2.5 cm/sec (%) | 0.000382 | 0.00728 | 0.00595 |
| AC Flex Lt. Wt. (cycles) | 10 | 12 | 8 |
| Water Rise, ≈ 31 in./min. (inches H₂O) | 60.5 | 56.8 | 58.7 |
| Gamma | 12.7 | 12.8 | 13.0 |

The flex tensile strength and flex tensile elongation properties of the filter media of Examples 1-3 were measured at specific time increments while exposed to humid aging conditions at a temperature of 50° C. and a relative humidity of 90%. The results of the measurements were recorded in Table 5. The results show that the glass fiber compositions described herein may have a high Kdis and may be used to manufacture filter media that exhibit favorable mechanical and filtration properties.

TABLE 5

Flex Tensile and Flex Elongation Properties Measured of Fiber Webs for Examples 1-3.

|  | As Is | 24 hr | 48 hr | 72 hr | 96 hr |
|---|---|---|---|---|---|
| Flex Tensile Strength |  |  |  |  |  |
| Example 1 | 3.58 | 3.35 | 3.26 | 3.06 | 2.97 |
| Example 2 | 3.38 | 2.93 | 2.99 | 2.68 | 2.47 |
| Example 3 | 2.70 | 2.45 | 2.31 | 2.25 | 2.36 |

TABLE 5-continued

Flex Tensile and Flex Elongation Properties Measured of Fiber Webs for Examples 1-3.

|  | As Is | 24 hr | 48 hr | 72 hr | 96 hr |
|---|---|---|---|---|---|
| Flex Elongation |  |  |  |  |  |
| Example 1 | 0.40 | 0.38 | 0.37 | 0.37 | 0.38 |
| Example 2 | 0.42 | 0.38 | 0.39 | 0.36 | 0.32 |
| Example 3 | 0.41 | 0.39 | 0.34 | 0.38 | 0.36 |

The above results are provided only as examples of suitable filter media described herein.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media comprising:
a fiber web including a plurality of glass fibers having an average diameter of less than about 3.0 microns, an alumina content of between about 0.5 wt % and about 10 wt %, a $B_2O_3$ content of greater than about 5.0 wt % and a BaO content greater than about 7.2 wt %.

2. The filter media of claim 1, wherein the BaO content is greater than about 8.0 wt %.

3. The filter media of claim 1, wherein the BaO content is less than about 20.0 wt %.

4. The filter media of claim 1, wherein the glass fibers have an alumina content of less than about 3.5 wt %.

5. The filter media of claim 1, wherein the glass fibers have a total alkali oxide content of greater than about 10.0 wt %.

6. The filter media of claim 1, wherein the glass fibers have a total alkaline earth content of less than about 20.0 wt %.

7. The filter media of claim 1, wherein the glass fibers have a $B_2O_3$ content of less than about 15.0 wt %.

8. The filter media of claim 1, wherein the glass fibers have a $B_2O_3$ content of greater than about 8.0 wt %.

9. The filter media of claim 1, wherein the glass fibers have a silica content of greater than about 60.0 wt %.

10. The filter media of claim 1, wherein the glass fibers have a ZnO content of greater than about 1.5 wt %.

11. The filter media of claim 1, wherein the fiber web exhibits a Kdis after 28 days of greater than about 95 ng/hour/cm².

12. The filter media of claim 11, wherein the fiber web exhibits a Kdis after 28 days of greater than about 115 ng/hour/cm².

13. The filter media of claim 1, wherein the glass fibers have an average diameter of greater than about 0.1 micron.

14. The filter media of claim 1, wherein the filter media has a thickness of between about 0.10 mm and about 10.0 mm and a basis weight of between about 5 gsm and about 1000 gsm.

15. A filter element comprising the filter media of claim 1.

16. The filter media of claim 4, wherein the glass fibers have an alumina content of between about 0.5 wt % and about 3.5 wt %.

17. The filter media of claim 16, wherein the glass fibers have an alumina content of between about 1.0 wt % and about 2.5 wt %.

* * * * *